(12) United States Patent
Ogata

(10) Patent No.: US 8,295,146 B2
(45) Date of Patent: Oct. 23, 2012

(54) EXTRACTION OPTICAL SYSTEM, OPTICAL PICK-UP DEVICE AND OPTICAL DISC APPARATUS

(75) Inventor: Tetsuya Ogata, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 847 days.

(21) Appl. No.: 11/581,397

(22) Filed: Oct. 17, 2006

(65) Prior Publication Data
US 2007/0104072 A1    May 10, 2007

(30) Foreign Application Priority Data
Nov. 8, 2005  (JP) ................................. 2005-322998

(51) Int. Cl.
*G11B 7/135*    (2006.01)
(52) U.S. Cl. ................................................. 369/112.29
(58) Field of Classification Search ........................ None
See application file for complete search history.

(56) References Cited

U.S. PATENT DOCUMENTS

| | | | |
|---|---|---|---|
| 6,094,410 A * | 7/2000 | Fan et al. | 369/94 |
| 6,201,780 B1 * | 3/2001 | Katayama | 369/112.19 |
| 6,243,327 B1 * | 6/2001 | Nakaoki et al. | 369/13.38 |
| 6,808,778 B2 * | 10/2004 | Arioka et al. | 428/64.1 |
| 6,868,055 B2 * | 3/2005 | Ueyama et al. | 369/112.15 |
| 7,616,531 B2 * | 11/2009 | Horiyama et al. | 369/44.12 |

FOREIGN PATENT DOCUMENTS

| | | |
|---|---|---|
| JP | 63-306546 | 12/1988 |
| JP | 9-320084 A | 12/1997 |
| JP | 2005-228436 | 8/2005 |

* cited by examiner

*Primary Examiner* — Joseph Feild
*Assistant Examiner* — Parul Gupta
(74) *Attorney, Agent, or Firm* — Dickstein Shapiro LLP

(57) ABSTRACT

An extraction optical system for use in an optical pick-up device receiving a reflected light from an optical disc having a plurality of recording layers is provided. The extraction optical system extracts from a light in which a signal light component from an access target recording layer of the plurality of recording layers and a stray light component from a recording layer other than the access target recording layer of the plurality of recording layers are mixed, the signal light component from the access target recording layer of the plurality of recording layers. The extraction optical system includes a condensing optical element arranged in an optical path of the light and condensing the light, and a selective optical system to which the light condensed by the condensing optical element is incident and reflecting a light primarily containing the signal light component.

11 Claims, 14 Drawing Sheets

LASER LIGHT

| TARGET RECORDING LAYER | LIGHT | OPTICAL PATH | | | |
|---|---|---|---|---|---|
| | | A | B | C | D |
| RECORDING LAYER L0 | FIRST REFLECTED LIGHT (SIGNAL LIGHT) | S | S | P | P |
| | SECOND REFLECTED LIGHT (STRAY LIGHT) | S | S | - | - |
| RECORDING LAYER L1 | FIRST REFLECTED LIGHT (STRAY LIGHT) | S | S | - | - |
| | SECOND REFLECTED LIGHT (SIGNAL LIGHT) | S | S | P | P |

EXTRACTION OPTICAL SYSTEM, OPTICAL PICK-UP DEVICE AND OPTICAL DISC APPARATUS

CROSS-REFERECE TO RELATED APPLICATIONS

The present application claims priority and contains subject matter rated to Japanese Patent Application No. 2005-322998 filed in the Japanese Patent Office on Nov. 8, 2005 and the entire contents of which are hereby incorporated herein by reference.

BACKGROUND OF THE INVENTION

1. Field of the Invention

The present invention relates to an extraction optical system, an optical pick-up device and an optical disc apparatus, and more particularly relates to an extraction optical system extracting a signal light component from a light in which the signal light component and a stray light component are mixed, an optical pick-up device including the extraction optical system and an optical disc apparatus provided with the optical pick-up device.

2. Discussion of the Background

Recently, accompanied by improvement of digital technology and advancement in data compression technology, an optical disc such as a DVD (digital versatile disc), etc. has come to attract attention as a medium for recording information, such as music, movie, photo, and computer software (hereinafter referred to as "contents" also), and concurrently with price-reduction of the optical disc, an optical disc apparatus using the optical disc as the medium for recording information has come into wide use.

The information volume of contents tends to increase year by year, and the recording capacity of the optical disc is expected to further increase. As a means to increase the recording capacity of the optical disc, a multi-layered recording layer is conceivable, and development of an optical disc having a plurality of recording layers (hereinafter referred to as "a multi-layered disc" also) and an optical disc apparatus geared to accessing the multi-layered disc is widely pursued.

In a multi-layered disc, if the interval between recording layers is broad, a signal from a selected recording layer deteriorates due to influence of spherical aberration, so that there is the tendency to narrow the interval between recording layers. However, if the interval between recording layers is narrowed, due to so-called cross talk between layers, not only a reflection at a target recording layer (hereinafter referred as "a signal light" also) but also a reflection at a recording layer other than the target recording layer (hereinafter referred to as "a stray light" also) are included at a high level in the return light from the multi-layered disc, so that the S/N ratio of a reproducing signal decreases.

With respect to the above-described problem, an apparatus in which the cross talk between layers is decreased when playing back a multi-layered disc has been proposed (see, for example, Japanese Patent No. 2624255).

In the apparatus proposed in JP No. 2624255, however, a signal detection optical system in which a pin hall is arranged to decrease the cross talk between layers and an astigmatism optical system detecting a disc position and a deviation in a condensing spot are individually necessary, so that it is relatively difficult to make the layout of the apparatus small. Thus, the apparatus has been unsuitable for the optical disc apparatus for which downsizing is desired. Further, an optical system described in the above-referred JP requires a light receiving element in each of the signal detection optical system and the astigmatism optical system, so that the cost is relatively high, which is inconvenient.

SUMMARY OF THE INVENTION

The present invention has been made in views of the above-discussed and other problems and addresses the above-discussed and other problems.

Preferred embodiments of the present invention provide a novel extraction optical system capable of obtaining a signal light component from a light in which the signal light component and a stray light component are mixed, without causing the system to be enlarged.

The preferred embodiments of the present invention further provide a novel optical pick-up device capable of obtaining a desired signal with accuracy from an optical disc having a plurality of recording layers, without causing the device to be enlarged.

The preferred embodiment of the present invention further provide a novel optical disc apparatus capable of reproducing information with accuracy from an optical disc having a plurality of recording layers, without causing the apparatus to be enlarged.

According to an embodiment of the present invention, an extraction optical system for use in an optical pick-up device receiving a reflected light from an optical disc having a plurality of recording layers is provided. The extraction optical system extracts from a light in which a signal light component from an access target recording layer of the plurality of recording layers and a stray light component from a recording layer other than the access target recording layer of the plurality of recording layers are mixed, the signal light component from the access target recording layer of the plurality of recording layers. The extraction optical system includes a condensing optical element arranged in an optical path of the light and condensing the light, and a selective optical system to which the light condensed by the condensing optical element is incident and reflecting a light primarily containing the signal light component.

In the above-described extraction optical system, the light in which the signal light component and the stray light component are mixed is condensed by the condensing optical element, and the light primarily containing the signal light is reflected by the extraction optical system. Accordingly, without causing the extraction optical system to be enlarged, the signal light component can be obtained from the light in which the signal light component and the stray light component are mixed.

According to another embodiment of the present invention, an optical pick-up device illuminating a light to an optical disc having a plurality of recording layers and receiving a reflected light from the optical disc is provided. The optical pick-up device includes a light source, an object lens condensing a light emitted from the light source to an access target recording layer of the plurality of recording layers of the optical disc, the extraction optical system of the present invention arranged on an optical path of a return light reflected by the optical disc via the object lens, and a light detection device receiving a light from the extraction optical system and generating a signal corresponding to the amount of the received light.

In the above-described optical pick-up device, the light primarily containing the signal light is obtained from the return light by the extraction optical system, the light primarily containing the signal light is received by the light detection device, and the signal corresponding to the amount of the received light is generated by the light detection device. That is, without causing the optical pick-up device to be enlarged, the light primarily containing the signal light is incident to the light detection device, so that the S/N ratio is improved and it is enabled to obtain a desired signal with accuracy from the optical disc having a plurality of recording layers.

According to still another embodiment of the present invention, an optical disc apparatus capable of performing at least reproducing information to an optical disc having a plurality of recording layers is provided. The optical disc apparatus includes the optical pick-up device of the present invention, and a processing device performing reproducing information recorded in the optical disc using an output signal of the light detection device of the optical pick-up device.

In the above-described optical disc apparatus, because the optical pick-up device of the present invention is provided, without causing the optical disc apparatus to be enlarged, a desired signal can be obtained with accuracy from the optical disc having a plurality of recording layers, and consequently, it is enabled to reproduce information with accuracy from the optical disc having a plurality of recording layers.

BRIEF DESCRIPTION OF THE DRAWINGS

A more complete appreciation of the present invention and many of the attended advantages thereof will be readily obtained as the present invention becomes better understood by reference to the following detailed description when considered in connection with the accompanying drawings, wherein.

DETAILED DESCRIPTION OF THE PREFERRED EMBODIMENTS

Figure 1:
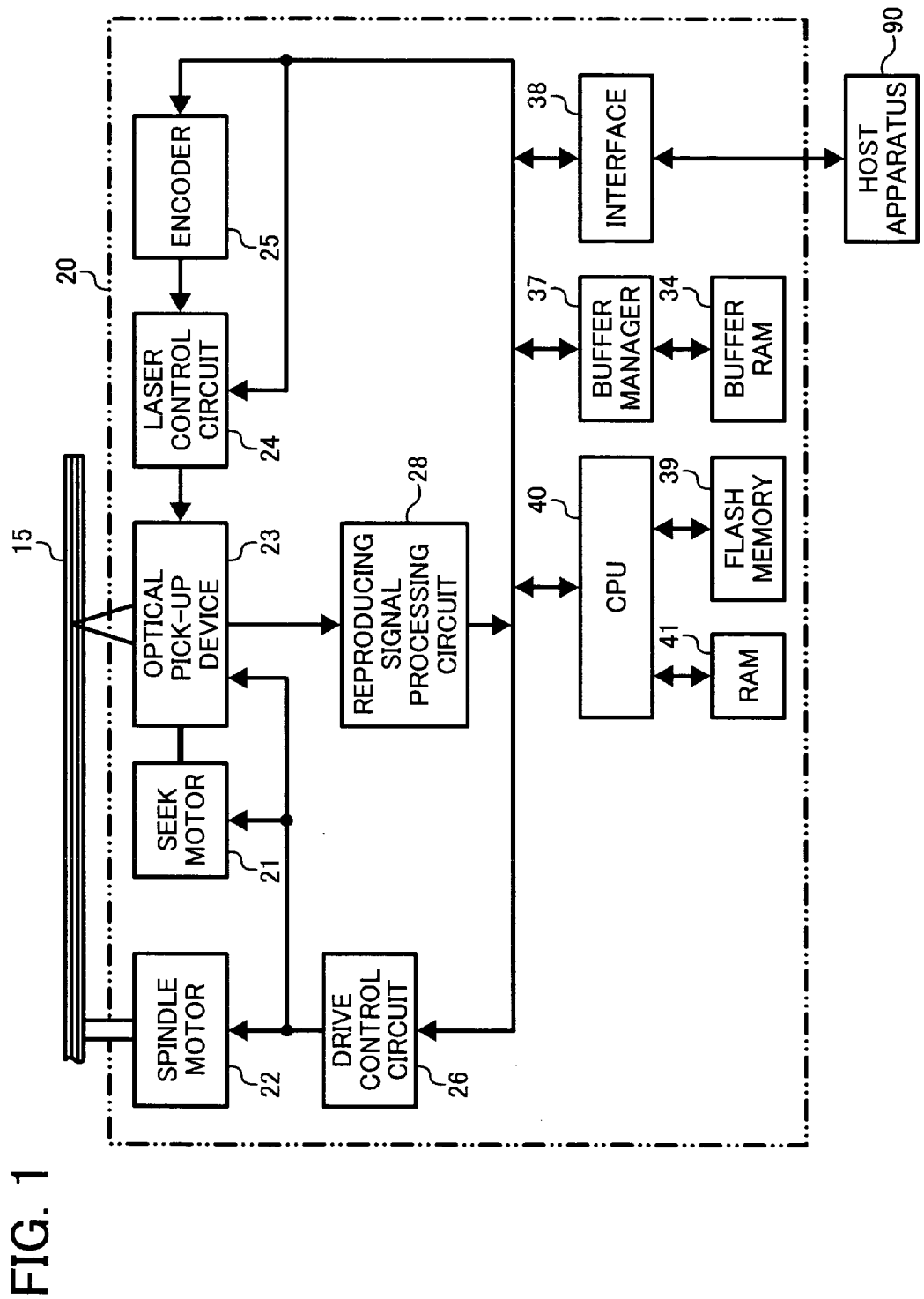
FIG. 1 is a block diagram schematically illustrating an exemplary construction of an optical disc apparatus according to an embodiment of the present invention.

Referring now to the drawings, wherein like reference numerals designate identical or corresponding parts throughout the several views, preferred embodiments of the present invention are described.

FIG. 1 is a diagram schematically illustrating an exemplary construction of an optical disc apparatus 20 according to an embodiment of the present invention.

The optical disc apparatus 20 includes a spindle motor 22 for driving an optical disc 15 to rotate, an optical pick-up device 23, a seek motor 21 for driving the optical pick-up device 23 in a sledge direction, a laser control circuit 24, an encoder 25, a drive control circuit 26, a reproducing signal processing circuit 28, a buffer RAM 34, a buffer manager 37, an interface 38, a flash memory 39, a CPU 40, and a RAM 41. Arrows in FIG. 1 indicate flows of typical signals and information and do not represent the whole of the connections among respective blocks. In this embodiment, the optical disc apparatus 20 is configured to deal with a multi-layered disc.

Figure 2:
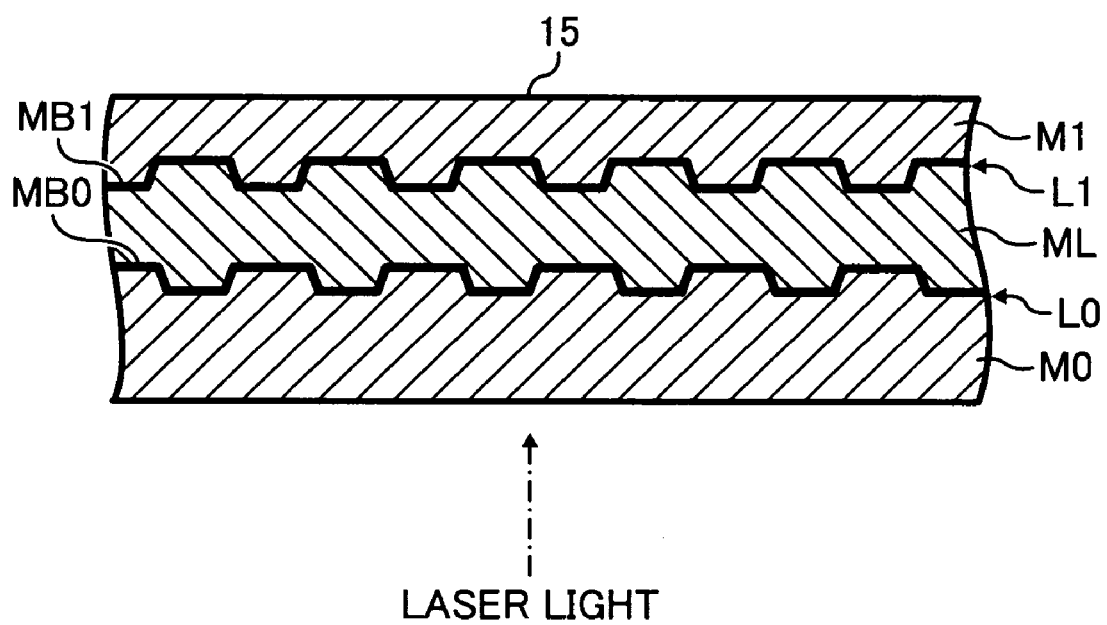
FIG. 2 is a diagram for explaining a construction of an optical disc in FIG. 1.

The optical disc 15 includes, as illustrated in FIG. 2 as an example, in order from the incident side of light, a substrate M0, a recording layer L0, an intermediate layer ML, a recording later L1, and a substrate M1. Further, a translucent film MB0 formed of gold or dielectric substance is provided between the recording layer L0 and the intermediate layer ML, and a reflective film MB1 formed of aluminum, etc. is provided between the recording layer L1 and the substrate M1. For the intermediate layer ML, an ultraviolet curing type resin material high in transmittance with respect to an illuminated light and having the refraction index close to the refraction index of the substrate M0 is used. That is, the optical disc 15 is a single-sided two-layered disc. In each recording layer, a track having a guide groove in a spiral or concentric circle shape is formed. The optical disc 15 is set in the optical disc apparatus 20 such that the recording layer L0 is closer to the optical pick-up device 23 than the recording layer L1. A part of the light incident to the optical disc 15 is reflected with the translucent film MB0, and the rest of the light transmits through the translucent film MB0. The light transmitted through the translucent film MB0 is reflected with the reflecting film MB1. Here, as an example, the optical disc 15 is an information recording medium of a DVD family.

Figure 3:
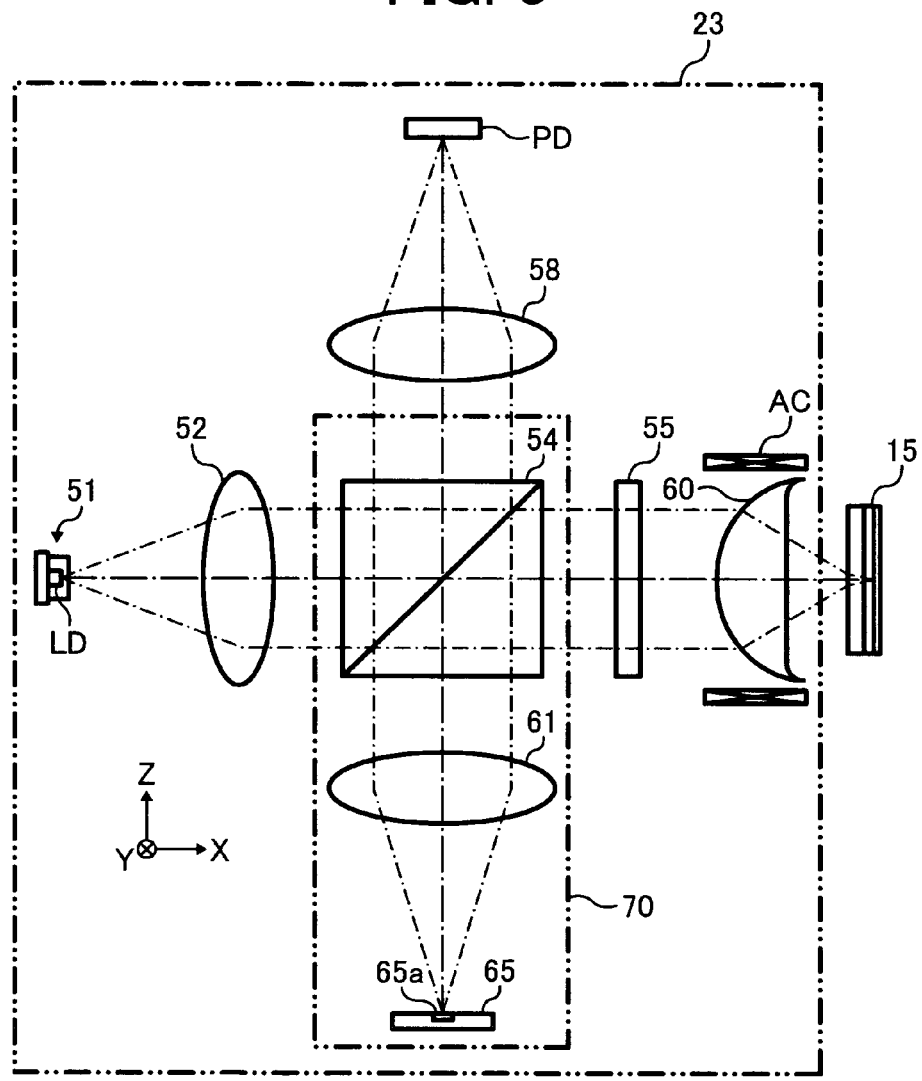
FIG. 3 is a diagram for explaining an optical pick-up device in FIG. 1.

The optical pick-up device 23 illuminates a laser light to an accessing target recording layer (hereinafter abbreviated to "a target recording layer") of the two recording layers of the optical disc 15 and receives a reflected light from the optical disc 15. The optical pick-up device 23 includes, as illustrated in FIG. 3 as an example, a light source unit 51, a coupling lens 52, a quarter-wave plate 55, an object lens 60, an extraction optical system 70, a detection lens 58, a light reception device PD serving as a light detection device, and a drive system for driving the object lens 60, which includes a focusing actuator AC and a tracking actuator (not shown).

The extraction optical system 70 includes a polarizing beam splitter 54 as a polarizing branching optical element, a lens 61 as a condensing optical element, a reflective plate 65a as a reflective half-wave plate, and a support member 65 supporting the reflective plate 65a.

The light source unit 51 includes a semiconductor laser LD as a light source emitting a laser light corresponding to the optical disc 15 and having the wavelength of about 660 nm. In this embodiment, the maximum strength emerging direction of the laser light emerged from the light source unit 51 is designated as the +X direction. Further, as an example, a polarized (P-polarized) light parallel to the incident surface of the polarizing beam splitter 54 is emerged from the light source unit 51.

On the +X direction side of the light source unit 51, the coupling lens 52 is arranged to make the emerged light from the light source unit 51 a substantially parallel light.

The polarizing beam splitter 54 is arranged on the +X direction side of the coupling lens 52. The polarizing beam splitter 54 has a different reflectance according to a polarization state of the incident light. Here, as an example, the polarizing beam splitter 54 is set such that the reflectance to the P-polarized light is small and the reflectance to the S-polarized light is large. That is, the majority of the light emerged from the light source unit 51 can transmit through the polarizing beam splitter 54. On the +X direction side of the polarizing beam splitter 54, the quarter-wave plate 55 is arranged.

The quarter-wave plate 55 gives a quarter-wave optical phase-contrast to the incident light. On the +X direction side of the quarter-wave plate 55, the object lens 60 is arranged to condense the light transmitted through the quarter-wave plate 55 to the target recording layer.

The lens 61 is arranged on the −Z direction side of the polarizing beam splitter 54 and condenses the return light reflected by the polarizing beam splitter 54.

Figure 4:
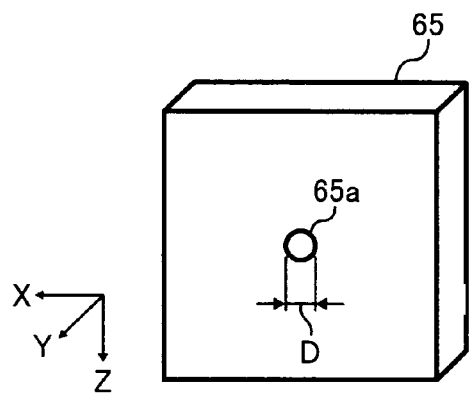
FIG. 4 is a diagram for explaining a reflective plate and a support member in FIG. 3.

The reflective plate 65a is arranged on the −Z direction side of the lens 61 in the vicinity of a condensing point of the signal light by the lens 61, gives a half-wave optical phase-contrast to the return light condensed by the lens 61, and reflects the return light toward the lens 61. For the reflective plate 65a, a sub-wave grid, a photonic crystal, etc. may be used. Further, the size of the reflective plate 65a ("D" in FIG. 4) is preferably equal to or smaller than 10 times of the airy disc of the signal light condensed by the lens 61 (=0.61×wavelength/NA). NA is the numerical aperture of the lens 61.

The support member 65 causes the incident light to transmit through or attenuate.

The detection lens 58 is arranged on the +Z direction side of the polarizing beam splitter 54, and condenses the return light reflected by the reflective plate 65a to the light reception surface of the light reception device PD. The light reception device PD includes a plurality of light reception elements (or light reception areas) for generating a signal (a photoelectric conversion signal) optimum for detecting a RF signal, a wobble signal, a servo signal, etc. in the reproducing signal processing circuit 28.

The focusing actuator AC is the actuator for slightly driving the object lens 60 in the focusing direction, which is the axial direction of the object lens 60. Here, for convenience, the optimum position of the object lens 60 with respect to the focusing direction when the target recording layer is the recording layer L0 is designated as "the first lens position" and the optimum position of the object lens 60 with respect to the focusing direction when the target recording layer is the recording layer L1 is designated as "the second lens position". When the object lens 60 is in the second lens position, the distance between the object lens 60 and the optical disc 15 is narrower than when the object lens 60 is in the first lens position (see FIG. 5A and FIG. 5B).

Figure 5A:
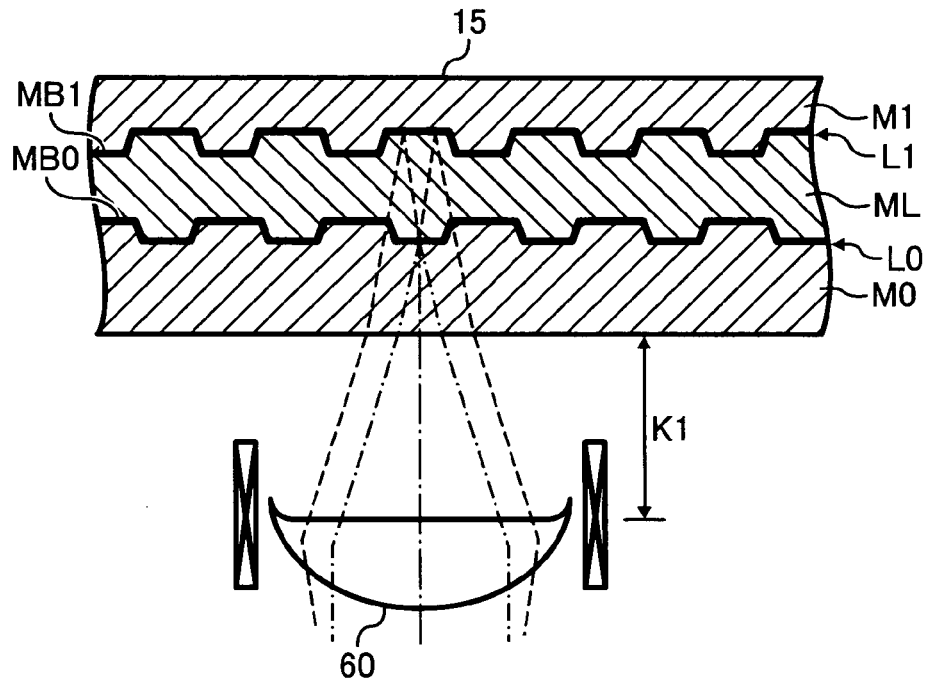
FIG. 5A and FIG. 5B are diagrams for explaining a signal light and a stray light, respectively.
Figure 5B:
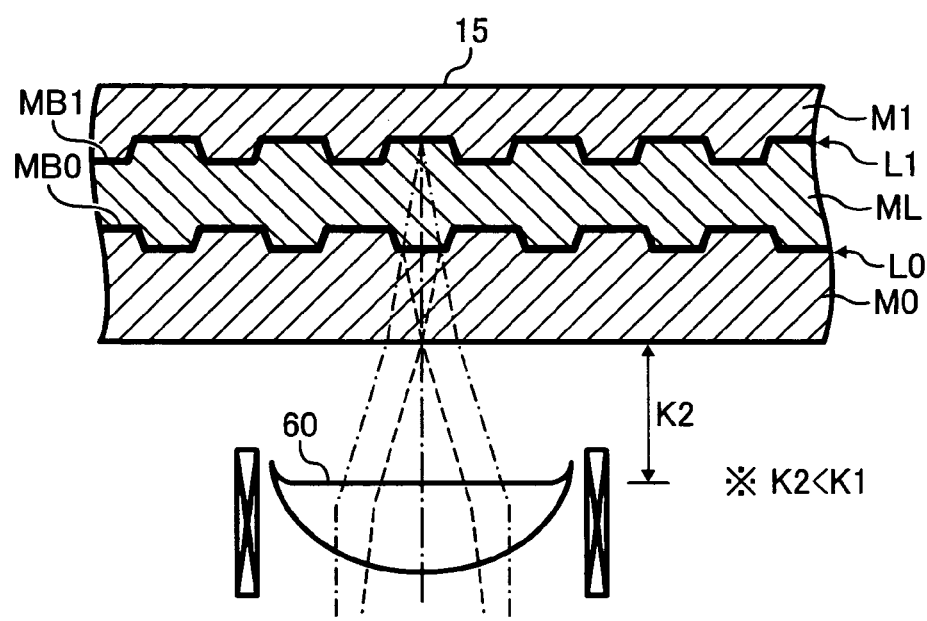

Here, description is made with respect to the return light from the optical disc 15 with reference to FIG. 5A and FIG. 5B.

When the target recording layer is the recording layer L0, as illustrated in FIG. 5A as an example, the object lens 60 is positioned in the first lens position. Thereby, the light emerged from the light source unit 51 is condensed to the recording layer L0 by the object lens 60. Then, the light reflected by the translucent film MB0 is incident to the object lens 60 as the signal light. On the other hand, the light transmitted through the translucent film MB0 and reflected by the reflective film MB1 is incident to the object lens 60 as the stray light.

When the target recording layer is the recording layer L1, as illustrated in FIG. 5B as an example, the object lens 60 is positioned in the second lens position. Thereby, the light emerged from the light source unit 51 is condensed to the recording layer L1 by the object lens 60. Then, the light reflected by the reflective film MB1 is incident to the object lens 60 as the signal light. On the other hand, the light reflected by the translucent film MB0 is incident to the object lens 60 as the stray light.

That is, whichever the target recording layer is, in the return light, the light reflected by the translucent film MB0 (hereinafter referred to as "the first reflected light" also) and the light reflected by the reflective film MB1 (hereinafter referred to as the "second reflected light" also) are included. Here, when the target recording layer is the recording layer L0, the first reflected light is the signal light and the second reflected light is the stray light. On the other hand, when the target recording layer is the recording layer L1, the second reflected light is the signal light and the first reflected light is the stray light. Because the stray light component becomes a factor to decrease the S/N ratio when detecting various signals with the reproducing signal processing circuit 28, it is necessary to remove the stray light component included in the return light.

Further, because the translucent film MB0 and the reflective film MB1 are separated from each other with respect to the focusing direction, the condensing position of the first reflected light transmitted through the lens 61 and the condensing position of the second reflected light transmitted through the lens 61 do not accord and are separate from each other with respect to the optical axial direction of the lens 61.

Figure 6A:
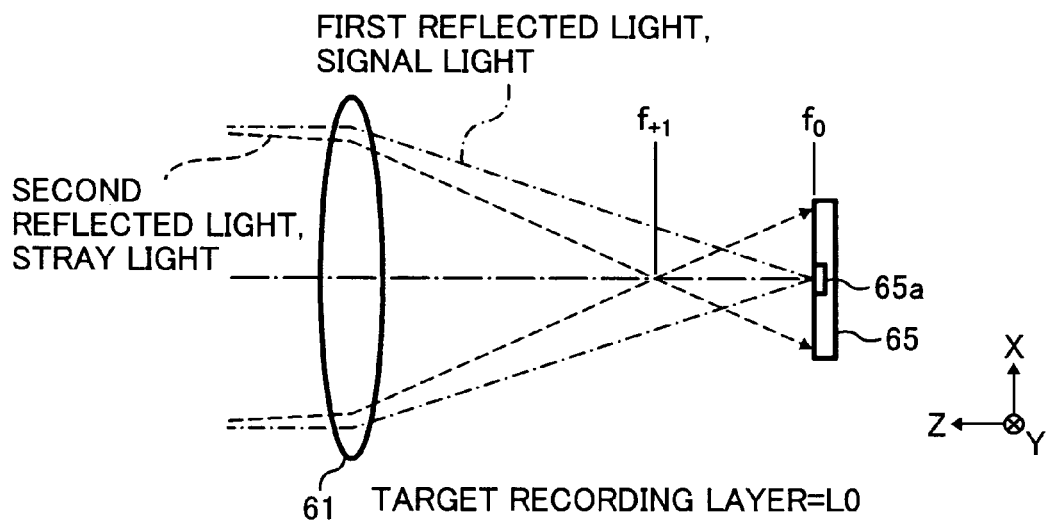
FIG. 6A and FIG. 6B are diagrams for explaining the operation of an extraction optical system in FIG. 3, respectively.
Figure 6B:
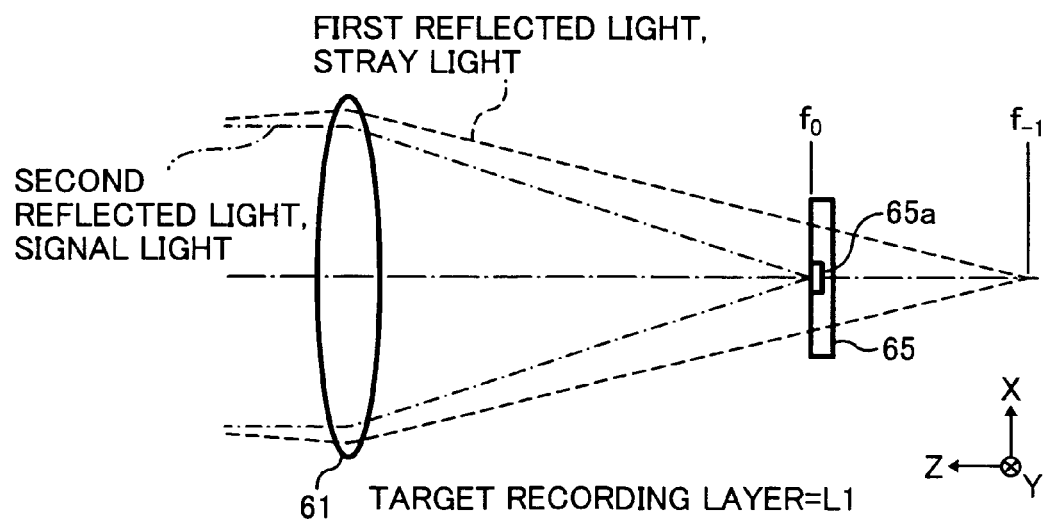

In this embodiment, as illustrated in FIG. 6A as an example, when the target recording layer is the recording layer L0, the condensing position of the second reflected light transmitted through the lens 61 is $f_{+1}$, and the condensing position of the first reflected light is $f_0$. Further, as illustrated in FIG. 6B as an example, when the target recording layer is the recording layer L1, the condensing position of the second reflected light transmitted through the lens 61 is $f_0$, and the condensing position of the first reflected light is $f_{-1}$. That is, the condensing position of the signal light is $f_0$, and the condensing position of the stray light by the recording layer in the position farther than the target recording layer with respect to the distance to the object lens 60 is $f_{+1}$, and the condensing position of the stray light by the recording layer in the position closer than the target recording layer with respect to the distance to the object lens 60 is $f_{-1}$.

Figures 7, 8:
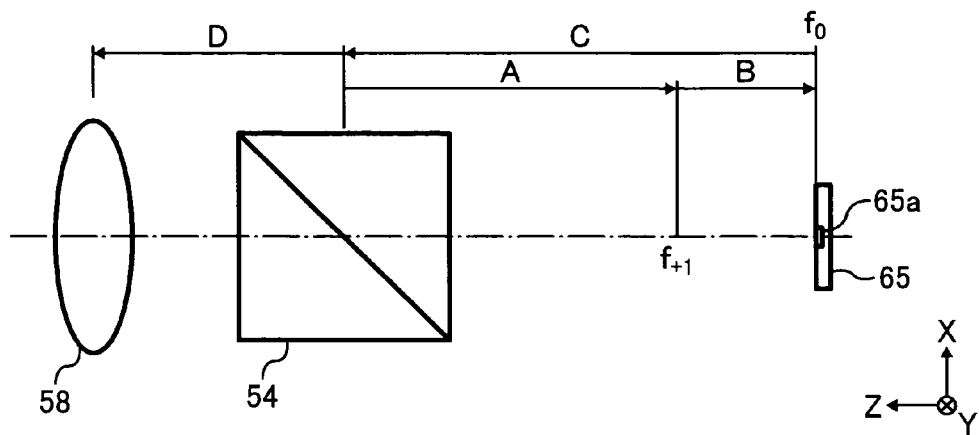
FIG. 7 is a diagram for explaining the operation of the extraction optical system.
FIG. 8 is another diagram for explaining the operation of the extraction optical system.

Now, the operation of the optical pick-up device 23 constructed as described above is described referring to FIG. 3, FIG. 6A, FIG. 6B, FIG. 7 and FIG. 8. Here, for convenience, with respect to the optical axial direction of the lens 61, the optical path from the polarizing beam splitter 54 toward the condensing position $f_{+1}$ is an optical path A, the optical path from the condensing position $f_{+1}$ toward the condensing position $f_0$ is an optical path B, the optical path from the condensing position $f_0$ toward the polarizing beam splitter 54 is an optical path C, and the optical path from the polarizing beam splitter 54 toward the detection lens 58 is an optical path D (see FIG. 7).

Referring to FIG. 3, a linearly polarized light (here, a P-polarized light) emerged from the light source unit 51 is made a substantially parallel light by the coupling lens 52, and is incident to the polarizing beam splitter 54. The majority of this light transmits through the polarizing beam splitter 54 as it is and is made a circularly polarized light by the quarter-wave plate 55, and is condensed as a minute spot to the target recording layer of the optical disc 15 via the object lens 60. The reflected light (the signal light and the stray light) from the optical disc 15 becomes a circularly polarized light circled in the opposite direction compared to the circularly polarized light in the optical path toward the optical disc 15 and is made a substantially parallel light again by the object lens 60 as the return light. The return light is made a linearly polarized light (here, a S-polarized light) orthogonal to the optical path toward the optical disc 15 by the quarter-wave plate 55 and is then incident to the polarizing beam splitter 54.

The return light reflected by the polarizing beam splitter 54 in the −Z direction is condensed by the lens 61. The return light via the lens 61 is incident to the reflective plate 65a. Each of the signal light and the stray light is a S-polarized light in the optical path A and the optical path B. The signal light is given a half-wave optical phase-contrast and is reflected as a P-polarized light at the reflective plate 65a. On the other hand, the beam of the stray light has been enlarged at the position of the reflective plate 65a, and the majority of the stray light transmits through the support member 65 or is absorbed by the support member 65 to be attenuated. That is, almost all of the light reflected by the reflective plate 65a is the P-polarized signal light.

The signal light reflected by the reflective plate 65a is incident to the polarizing beam splitter 54 via the lens 61. The P-polarized signal light transmits through the polarizing beam splitter 54 as it is, and is received by the light reception device PD via the detection lens 68. The light reception device PD performs photoelectric conversion to the signal light for each light reception element (or light reception area), and each photoelectric conversion signal is output to the reproducing signal processing circuit 28. Here, because the light primarily containing the signal light is received with the light reception device PD, the photoelectric conversion signal high in the S/N ratio is output.

Figure 9A:
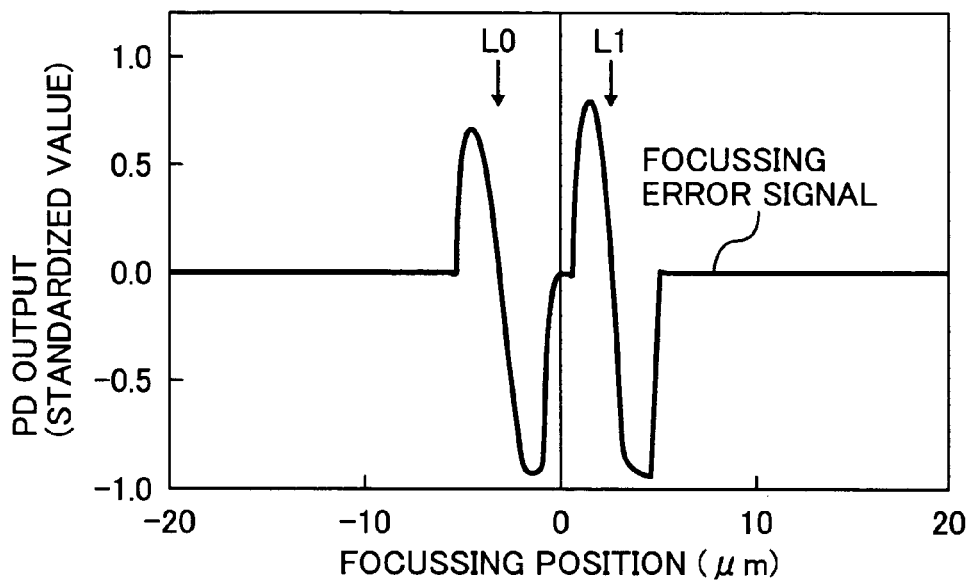
FIG. 9A and FIG. 9B are diagrams for explaining a focusing error signal and a sum signal obtained by a reproducing signal processing circuit in FIG. 1, respectively.
Figure 9B:
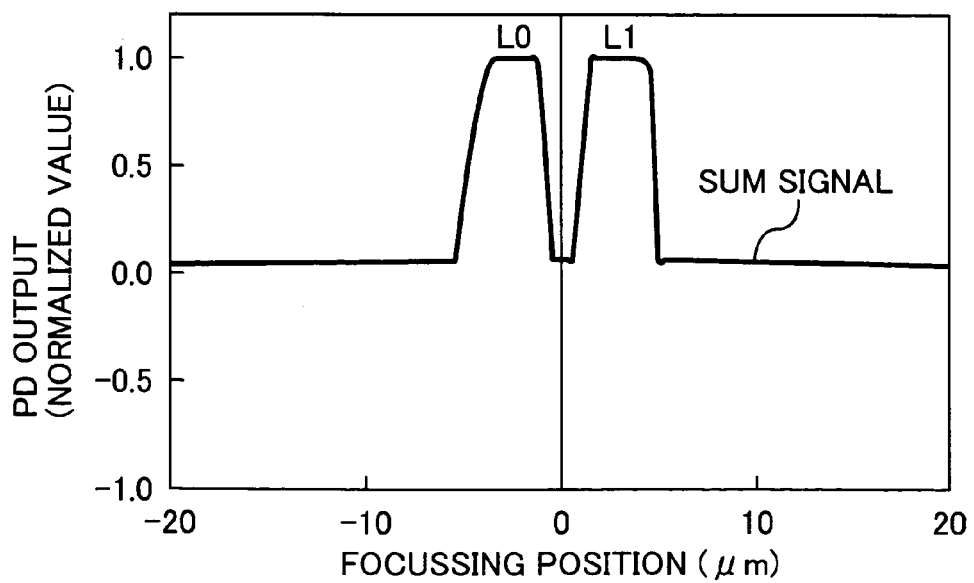
Figure 10A:
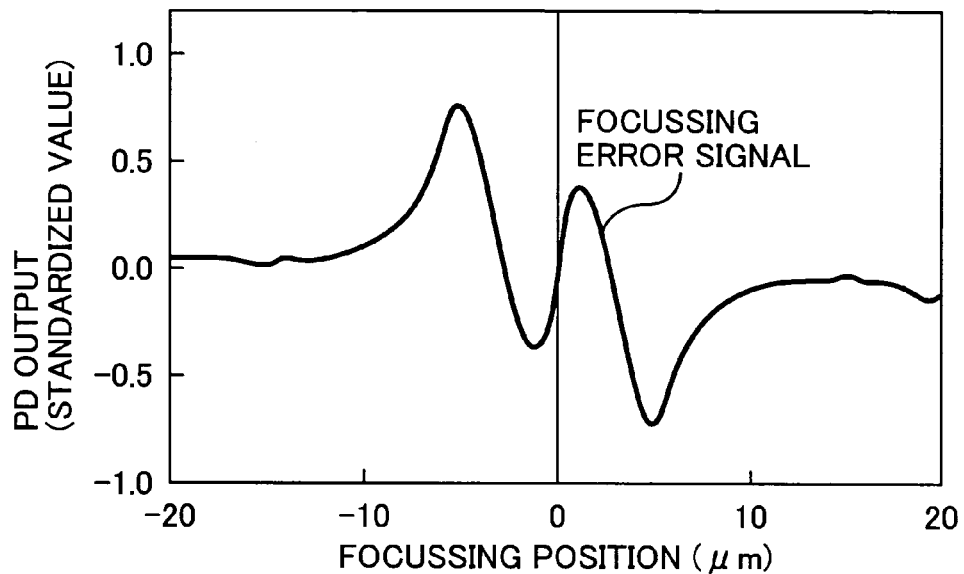
FIG. 10A and FIG. 10B are diagrams for explaining a focusing error signal and a sum signal obtained in a background art, respectively.
Figure 10B:
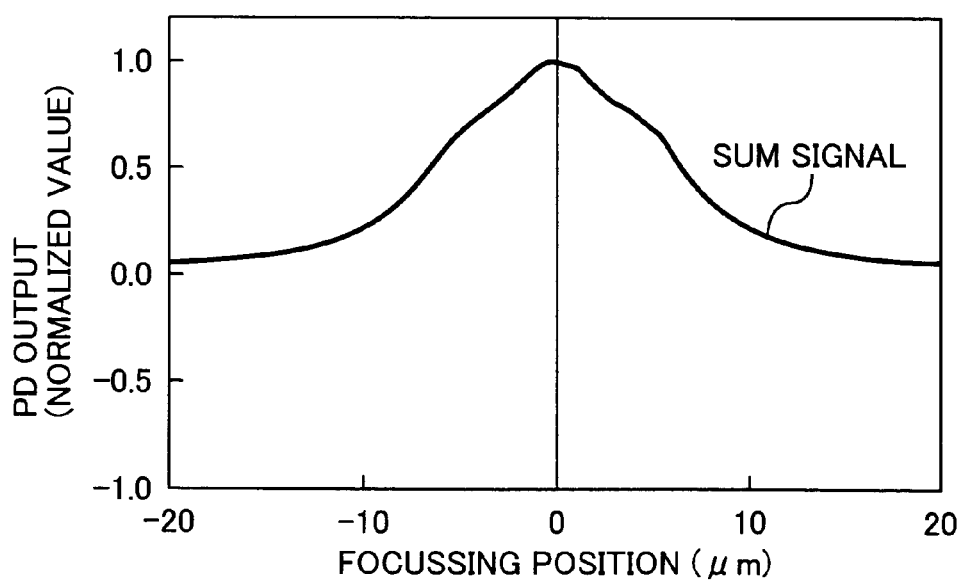

Returning to FIG. 1, the reproducing signal processing circuit 28 obtains a servo signal (a focusing error signal, a track error signal, etc.), address information, synchronization information, a RF signal, etc. Here, because the photoelectric conversion signal high in the S/N ratio is output from the light reception device PD, the servo signal, the address information, the synchronization information, the RF signal, etc. can be obtained with accuracy. For example, as illustrated in FIG. 9A, the linear part of a focusing error signal is longer than in the background art (see, for example, FIG. 10A), so that the amount of a positional deviation can be detected with accuracy. The vertical axis in FIG. 9A is standardized, and for example, suppose the light reception device PD is divided into two light reception areas by a division line in the direction corresponding to the tracking direction and output signals of respective light reception areas are "Sa" and "Sb", the vertical axis in FIG. 9A is (Sa−Sb)/Sa+Sb). Further, as illustrated in FIG. 9B as an example, a sum signal including a RF signal (a signal obtained by adding a plurality of photoelectric conversion signals) is more stable than in the background art (see, for example, FIG. 10B), so that the RF signal can be obtained with accuracy. The vertical axis in FIG. 9B is normalized, and the maximum value of the sum signal is 1. The data in FIG. 9A and FIG. 9B is the one when the thickness of the intermediate layer ML is about 9 μm, NA of the object lens 60 is about 0.65, and the wavelength of the laser light is about 660 nm.

The servo signal obtained here is output to the drive control circuit 26, the address information is output to the CPU 40, the synchronization signal is output to the encoder 25, the drive control circuit 26, etc. The reproducing signal processing circuit 28 performs decoding processing and error detection processing to the RF signal, and when an error has been detected after performing error correction processing, stores the RF signal as reproducing data in the buffer RAM 34 via the buffer manager 37. The address information included in the reproducing data is output to the CPU 40.

The drive control circuit 26 generates a drive signal of the tracking actuator for correcting the positional deviation of the object lens 60 with respect to the tracking direction based on the track error signal from the reproducing signal processing circuit 28. The drive control circuit 26 also generates a drive signal of the focusing actuator AC for correcting the focusing deviation of the object lens 60 based on the focusing error signal from the reproducing signal processing circuit 28. The drive signal of each actuator generated here is output to the optical pick-up device 23. Thereby, tracking control and focusing control are performed. Further, the drive control circuit 26 generates a drive signal for driving the seek motor 21 and a drive signal for driving the spindle motor 22, based on instructions of the CPU 40. The drive signals for respective motors are output to the seek motor 21 and the spindle motor 22, respectively.

In the buffer RAM 34, data to be recorded in the optical disc 15 (recording data) and data reproduced from the optical disc 15 (reproduced data) are temporarily stored. The buffer manager 37 manages inputting and outputting data to and from the buffer RAM 34.

The encoder 25 retrieves the recording data stored in the buffer RAM 34 via the buffer manager 37, performs modulating the data and adding an error correction code, and generates a writing signal to the optical disc 15, based on instructions of the CPU 40. The generated writing signal is output to the laser control circuit 24.

The laser control circuit 24 controls the emission power of the semiconductor laser LD. For example, in recording, the drive signal of the semiconductor laser LD is generated in the laser control circuit 24 based on the writing signal, the recording condition, the emission characteristics of the semiconductor laser LD, etc.

The interface 38 is a duplex communication interface with a host apparatus 90 (for example, a PC), and conforms to standard interfaces, such as ATAPI (AT Attachment Packet Interface), SCSI (Small Computer System Interface), USB (Universal Serial Bus), etc.

In the flash memory 39, various programs described in codes that can be decoded by the CPU 40, the recording condition including the recording power and the recording strategy information, the emission characteristics of the semiconductor laser LD, etc. are stored.

The CPU 40 controls operations of the above-described respective parts according to the programs stored in the flash memory 39, and stores data necessary for control in the RAM 41 and the buffer RAM 34.

Figure 11:
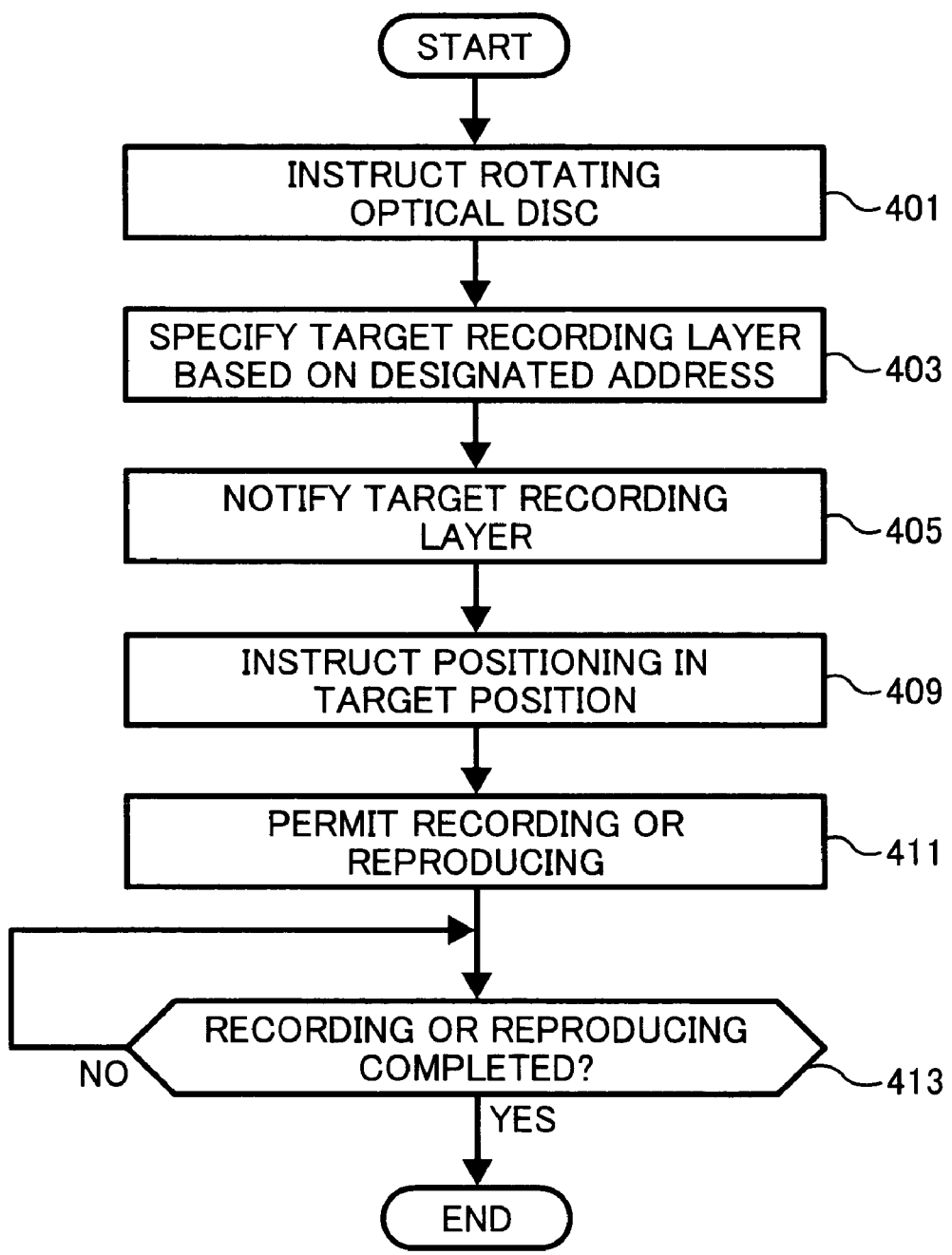
FIG. 11 is a flowchart for explaining a process in the optical disc apparatus when an access request has been received from a host apparatus.

Next, the process in the optical disc apparatus 20 when an access request has been received from the host apparatus 90 is described referring to FIG. 11. The flowchart in FIG. 11 corresponds to a series of processing algorithms executed by the CPU 40.

If a recording request command or a reproducing request command (hereinafter collectively called "a request command") is received from the host apparatus 90, the leading address of a program corresponding to the flowchart of FIG. 11 is set in the program counter of the CPU 40, and the process starts.

In step 401, an instruction is made to the drive control circuit 26 to rotate the optical disc 15 at a predetermined linear (or angular) speed, and a notice is made to the reproducing signal processing circuit 28 to the effect that a request command has been received from the host apparatus 90.

In step 403, a designated address is extracted from the request command, and based on the designated address, whether the target recording layer is the recording layer L0 or the recording layer L1 is specified.

In step 405, information as to the specified recording layer is notified to the drive control circuit 26, etc.

In step 409, an instruction is made to the drive control circuit 26 so that an optical spot is formed in the vicinity of a target position corresponding to the designated address. Thereby, a seek operation is performed. If the seek operation is unnecessary, the process here is skipped.

In step 411, recording or reproducing is permitted according to the request command.

In step 413, it is determined if recording or reproducing has been completed. If recording or reproduction has not been completed, decision is made again after a predetermined period time. If recording or reproducing has been competed, the process ends.

As apparent from the description above, in the optical disc apparatus 20 according to the above-described embodiment of the present invention, a processing device is realized by the reproducing signal processing circuit 28, the CPU 40 and the program executed by the CPU 40. Apart of the processing device that is realized by a process according to the program executed by the CPU 40 may be constituted of hardware, or the whole part of the processing device may be constituted of hardware.

As described above, according to the optical pick-up device 23 in this embodiment, a linearly polarized (P-polarized) light emerged from the light source unit 51 is condensed to the target recording layer of the optical disc 15 as a minute spot via the coupling lens 52, the polarizing beam splitter 54 (a polarizing branching optical element), the quarter-wave plate 55 and the object lens 60. The return light (the signal light and the stray light) from the optical disc 15 becomes a linearly polarized (S-polarized) light orthogonal to the optical path toward the optical disc 15 and is incident to the polarizing beam splitter 54. The return light reflected in the –Z direction by the polarizing beam splitter 54 is made a converging light by the lens 61 (a condensing optical element) and is incident to the reflective plate 65*a*. The signal light included in the return light is given a half-wave optical phase-contrast and is reflected by the reflective plate 65*a*. On the other hand, the majority of the stray light included in the return light transmits through the support member 65 or is absorbed by the support member 65 to be attenuated. That is, almost all of the light reflected by the reflective plate 65*a* becomes a P-polarized signal light. The signal light reflected by the reflective plate 65*a* (a light primarily including a signal light) is received with the light reception device PD via the lens 61, the polarizing beam splitter 54 and the detection lens 58. In this case, because the light primarily including the signal light is received with the light reception device PD, the photoelectric conversion signal high in the S/N ratio is output. Accordingly, it is enabled to obtain a desired signal with accuracy from an optical disc having a plurality of recording layers.

Further, according to the optical disc apparatus 20 according this embodiment, because the photoelectric conversion signal high in the S/N ratio is output from the optical pick-up device 23, it is enabled to perform accessing an optical disc having a plurality of recording layers with accuracy in a stable manner. Accordingly, it is possible to perform reproducing information from an optical disc having a plurality of recording layers with accuracy.

Figure 12:
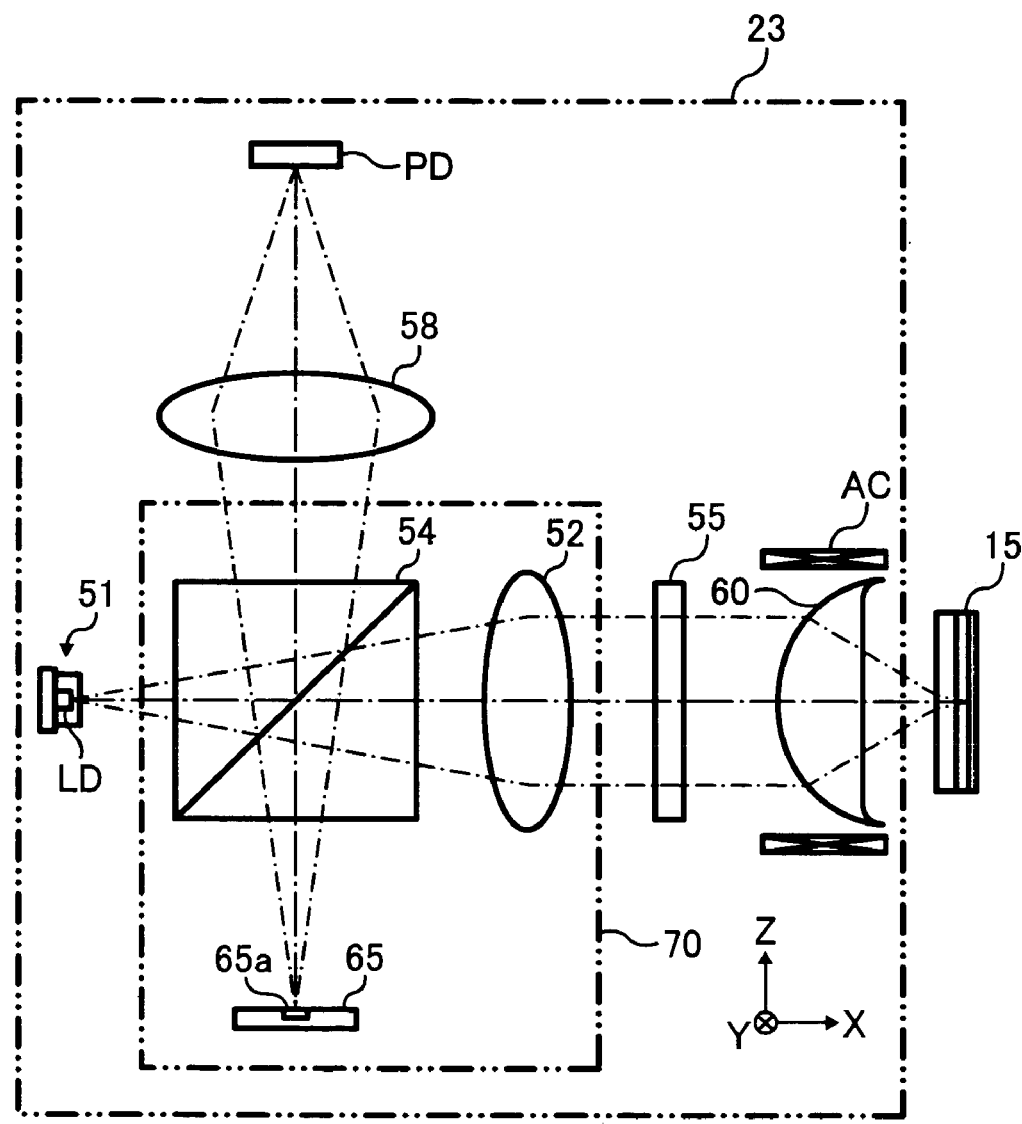
FIG. 12 is a diagram for explaining a variation of the extraction optical system in FIG. 3.

In the above-described embodiment, as illustrated in FIG. 12, the coupling lens 52 may be arranged on the +X direction side of the polarizing beam splitter 54. Thereby, with respect to the return light, the coupling lens 52 performs the function equivalent to that of the lens 61. That is, here, the extraction optical system 70 is constituted of the polarizing beam splitter 54, the coupling lens 52, the reflective plate 65*a* and the support member 65. The operation of the extraction optical system 70 in this configuration is similar to that of the extraction optical system 70 in the above-described embodiment, and the effects similar to those in the above-described embodiment can be obtained. Further, the number of parts is further decreased, and it is possible to further downsize the optical pick-up device 23.

Figure 13:
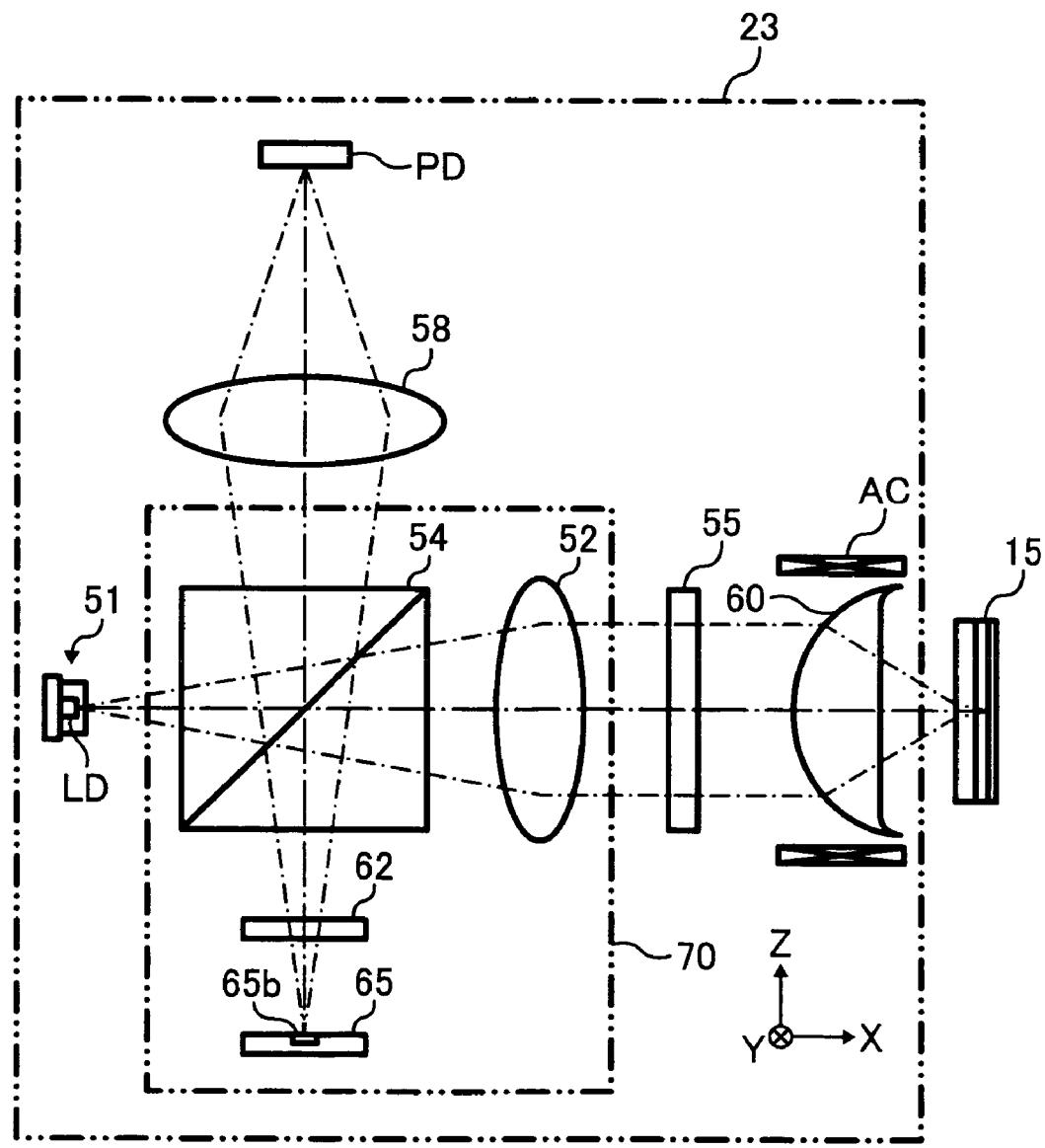
FIG. 13 is a diagram for explaining another variation of the extraction optical system in FIG. 3.

In this case, as illustrated in FIG. 13, a quarter-wave plate 62 may be arranged between the polarizing beam splitter 54 and the reflective plate 65*a* and in place of the reflective plate 65*a*, a mirror 65*b* may be used as a reflective member reflecting an incident light as it is.

In this case, the return light reflected by the polarizing beam splitter 54 is converted by the quarter-wave plate 62 to a circularly polarized light and is incident to the mirror 65*b*. The signal light included in the return light is reflected by the mirror 65*b*, becomes a circularly polarized light in the opposite circling direction, and is incident to the quarter-wave plate 62. The signal light is converted to a P-polarized light by the quarter-wave plate 62, and thereafter is incident to the polarizing beam splitter 54. On the other hand, the majority of the stray light included in the return light is attenuated as in the above-described embodiment. Accordingly, the effects similar to those in the above-described embodiment can be obtained. Here, the extraction optical system 70 is constituted of the polarizing beam splitter 54, the coupling lens 52, the quarter-wave plate 62, the mirror 65*b* and the support member 65.

Figure 14:
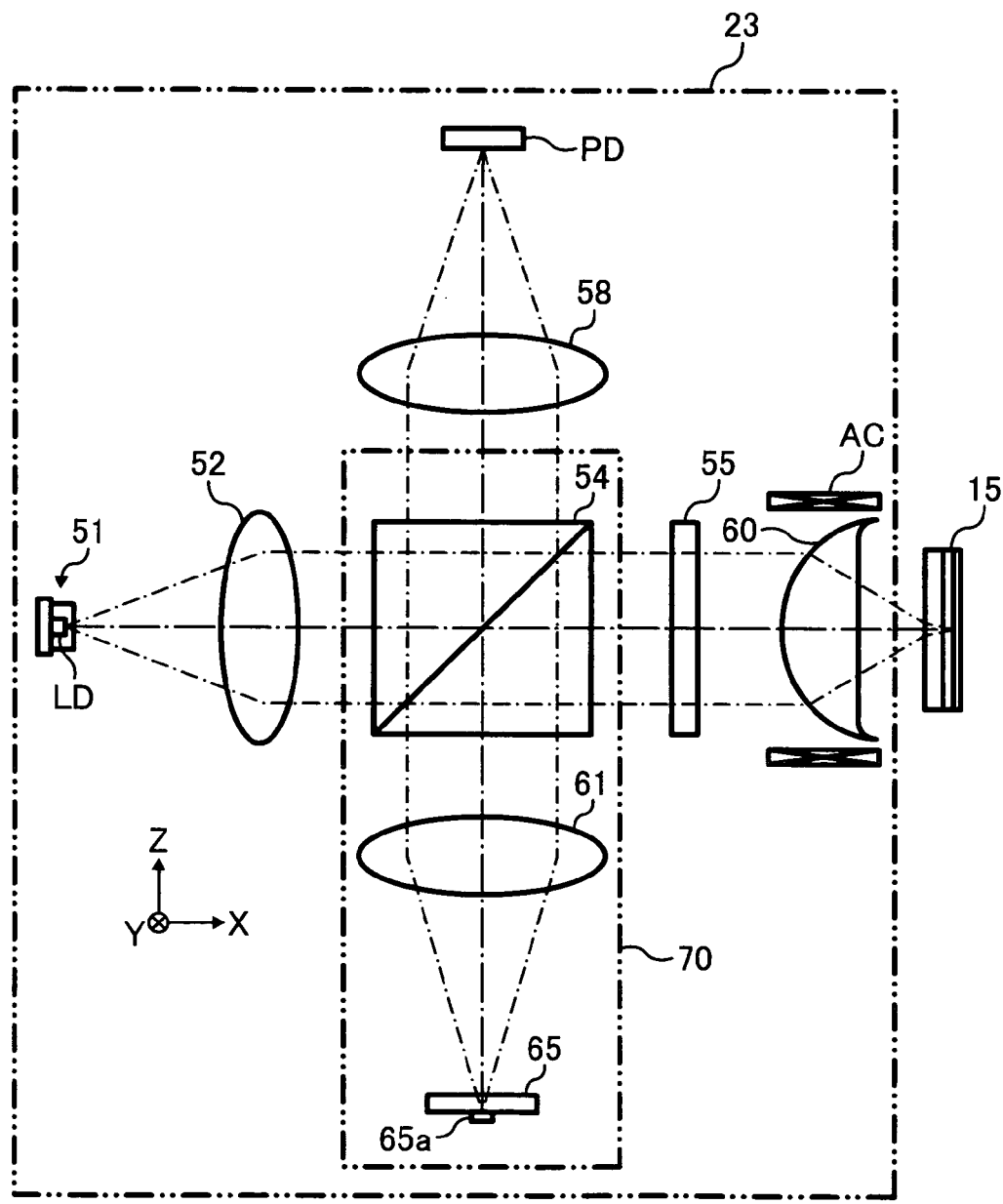
FIG. 14 is a diagram for explaining still another variation of the extraction optical system in FIG. 3.
Figure 15A:
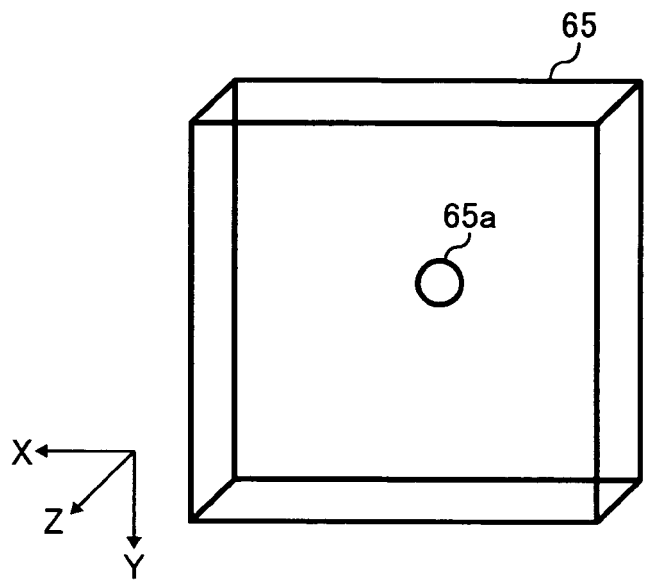
FIG. 15A and FIG. 15B are diagrams for explaining a reflective plate and a support member in FIG. 14.
Figure 15B:
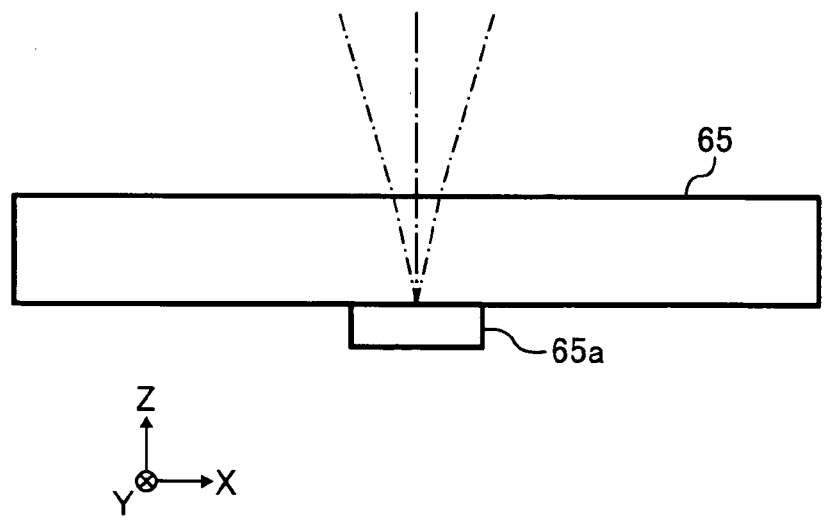

Further, in the above-described embodiment, as illustrated in FIG. 14, FIG. 15A and FIG. 15B, it may constructed such that the support member 65 is made of a transparent material whose refraction index is greater than 1 and the return light is incident to the reflective plate 65*a* via the transparent support member 65. Thereby, it maybe avoided that dust adheres to the surface of the reflective plate 65*a* and thereby the signal light is scattered.

In this case, the function of a quarter-wave plate may be added to the transparent support member 65 and the above-described mirror 65*b* may be used in place of the reflective plate 65*a*.

Figure 16:
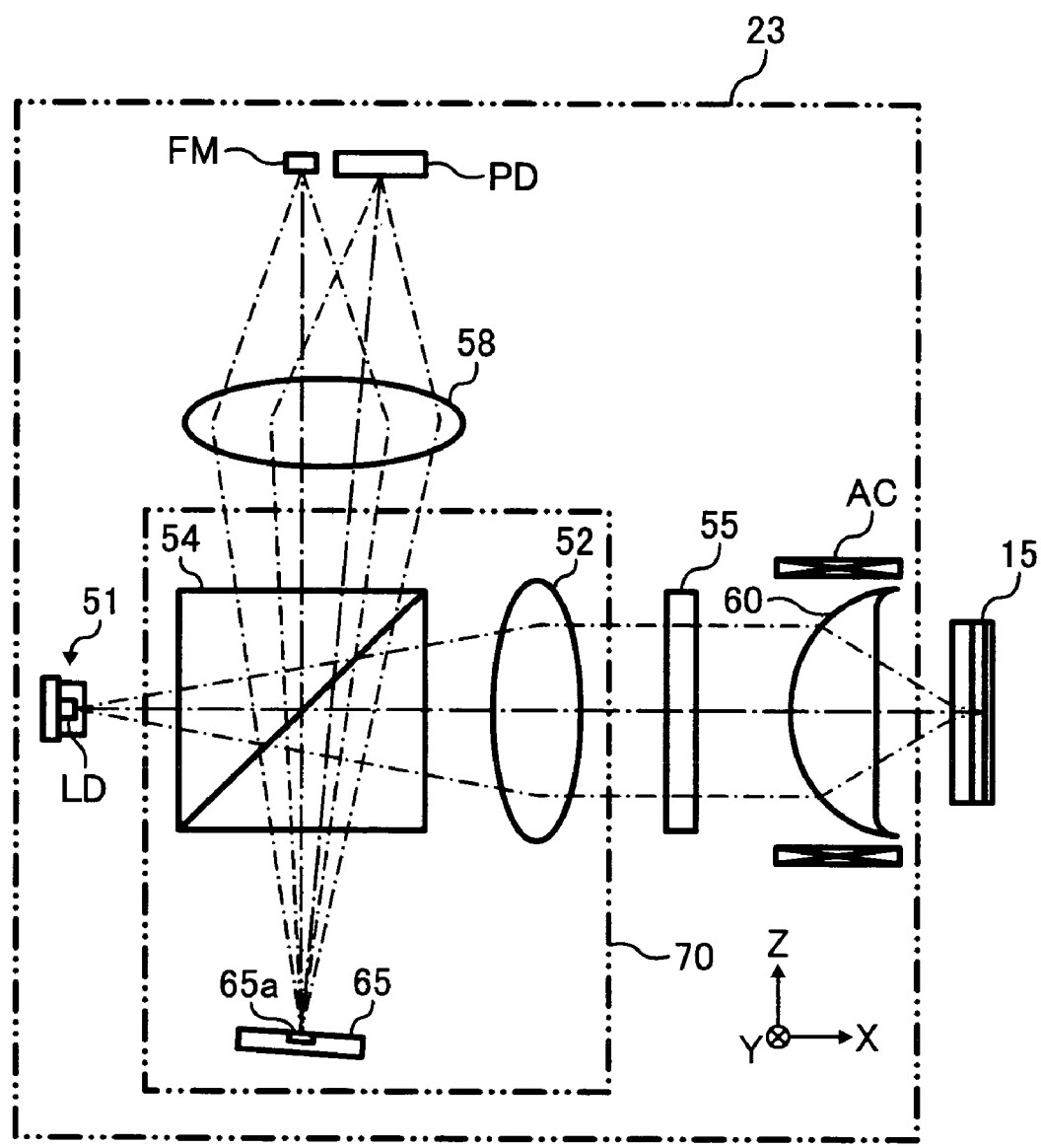
FIG. 16 is a diagram for explaining still another variation of the extraction optical system in FIG. 3.

Furthermore, in the above-described embodiment, as illustrated in FIG. 16 as an example, the reflective plate 65*a* may be slanted. In this case, by arranging the optical reception device PD in the vicinity of a condensing position of the signal light reflected by the reflective plate 65*a*, when a S-polarized light is included in the light emerging from the light source unit 51, the S-polarized light emerged from the light source unit 51 and reflected in the +Z direction by the polarizing beam splitter 54 is prevented from being incident to the optical reception device PD.

Further, in this case, by arranging a light reception element FM (a light reception element for monitoring) in the vicinity of a condensing position of the S-polarized light reflected in the +Z direction by the polarizing beam splitter 54, an output signal of the light reception element FM may be used as a monitor signal for the emission power of the semiconductor laser LD.

Further, in the above-described embodiment, the description has been made based on that the object lens 60 is the one of an infinite system, however, the object lens 60 may be the one of a finite system. Even in this case, it is possible to obtain the signal light in substantially the same construction as that in the above-described embodiment.

Furthermore, in the above-described embodiment, the description has been made with respect to the optical disc apparatus 20 capable of recording and reproducing information. However, the optical disc apparatus 20 may the one that is capable of at least reproducing information.

Furthermore, in the above-described embodiment, the description has been made with respect to the case that the optical disc 15 has two recording layers. However, the optical disc 15 may have three or more recording layers. In this case, for example, if the target recording layer is sandwiched between two recording layers, the return light includes a stray light condensing at this side of a condensing position of the signal light and another stray light condensing beyond the condensing position of the signal light. Even in this case, the signal light component can be obtained with the above-described extraction optical system 70. Further, although the description has been made in the above-described embodiment with respect to the case that the optical disc 15 is one of a DVD family, the optical disc 15 is not limited to the DVD family, and the optical disc 15 may be the one of a CD family or a next generation information recording medium supporting a light with the wavelength of 405 nm.

Further, in the above-described embodiment, the description has been made with respect to the case that the optical pick-up device 23 is provided with one semiconductor laser, however, the optical pick-up device 23 may be provided with a plurality of semiconductor lasers, each emitting a light different from each other in wavelength. In this case, for example, at least one of a semiconductor laser emitting a light with the wavelength of about 405 nm, a semiconductor laser emitting a light with the wavelength of about 660 nm and a semiconductor laser emitting a light with the wavelength of about 780 nm may be included. That is, the optical disc apparatus 20 may be the one supporting optical discs of plural kinds respectively conforming to different standards. In this case, any one of the optical discs may be the one including a plurality of recording layers.

Further, in the above-described embodiment, the optical disc apparatus 20 may be the one supporting optical discs of plural kinds that are responsive to the light with the same wavelength and that conform to different standards. For example, the optical disc apparatus 20 may be the one supporting either of an optical disc conforming to the standard that the light source wavelength is 400-410 nm and NA of the object lens is 0.85 (Blu-ray standard) and an optical disc conforming to the standard that NA of the object lens is 0.65 (HD-DVD standard) In this case, the light emitting point of an emerging light with respect to the optical disc conforming to the Blu-ray standard and that with respect to the optical disc conforming to the HD-DVD standard are the same, and the condensing position of the signal light by the lens 61 with respect to the optical disc conforming to the Blu-ray standard and that with respect to the optical disc conforming to the HD-DVD standard are the same, so that it is possible to extract the signal light with respect to each of two-layered discs conforming to respective standards.

As described above, according to the extraction optical system of the present invention, without causing the system to be enlarged, it is suitable for obtaining the signal light component from a light in which the signal light component and the stray light component are mixed. According to the optical pick-up device of the present invention, without causing the device to be enlarged, it is suitable for obtaining a desired signal with accuracy from an optical disc having a plurality of recording layers. Further, according to the optical disc apparatus of the present invention, it is suitable for performing with accuracy and stably accessing an optical disc having a plurality of recording layers.

Numerous additional modifications and variations of the present invention are possible in light of the above-teachings. It is therefore to be understood that within the scope of the claims, the present invention can be practiced otherwise than as specifically described herein.

What is claimed is:

1. An extraction optical system for use in an optical pick-up device receiving a reflected light from an optical disc having a plurality of recording layers, the system extracting from a light in which a signal light component from an access target recording layer of the plurality of recording layers and a stray light component from a recording layer other than the access target recording layer of the plurality of recording layers are mixed, the signal light component from the access target recording layer of the plurality of recording layers, the system comprising:
a condensing optical element arranged in an optical path of the reflected light and condensing the reflected light; and
a selective optical system to which the reflected light condensed by the condensing optical element is incident and reflecting a light primarily containing the signal light component, the selective optical system comprising a reflective plate and a support member supporting the reflective plate,
said condensing optical element focusing the reflected light on the reflective plate in the selective optical system, said reflective plate reflecting a center portion of the light primarily containing the signal light component, and
wherein said support member either allows the stray light component to pass through or attenuates the stray light component, and
wherein said reflective plate is more reflective than said support member, and
wherein the support member is a transparent member arranged on the condensing optical element side of the reflective plate.

2. The extraction optical system according to claim 1, wherein the reflective plate is a reflective half-wave plate arranged in the prescribed reflection area having a reflective surface of a same diameter as that of a beam spot of the signal light component focused thereon, and when reflecting the light, gives a half-wave optical phase-contrast with a phase advanced axis and a phase retarded axis.

3. The extraction optical system according to claim 2 wherein the reflective half-wave plate and the transparent member are integrated.

4. The extraction optical system according to claim 1, wherein the reflective plate is arranged in a condensing position of the signal light component condensed by the condensing optical element and has a reflective surface of a same diameter as that of a beam spot of the signal light component in the condensing position, and where the selective optical system includes a quarter-wave plate arranged on the condensing optical element side of the reflective member.

5. The extraction optical system according to claim 4, wherein the reflective plate and the quarter-wave plate are integrated.

6. The extraction optical system according to claim 4, wherein the transparent member is arranged on the quarter-wave plate side of the reflective plate.

7. The extraction optical system according to claim 6, wherein the reflective plate and the transparent member are integrated.

8. An optical pick-up device illuminating a light to an optical disc having a plurality of recording layers and receiving a reflected light from the optical disc, the optical pick-up device comprising:
- a light source;
- an object lens condensing a light emitted from the light source to an access target recording layer of the plurality of recording layers of the optical disc;
- an extraction optical system arranged on an optical path of a return light reflected by the optical disc via the object lens and extracting from a light in which a signal light component from the access target recording layer of the plurality of recording layers and a stray light component from a recording layer other than the access target recording layer of the plurality of recording layers are mixed, the signal light component from the access target recording layer of the plurality of recording layers, the extraction optical system including a condensing optical element arranged in an optical path of the light and condensing the light, and a selective optical system to which the light condensed by the condensing optical element is incident and reflecting a light primarily containing the signal light component, the selective optical system comprising a reflective plate and a support member supporting the reflective plate; and
- a light detection device receiving a light from the extraction optical system and generating a signal corresponding to the amount of the received light;
- said condensing optical element focusing the reflected light on the reflective plate in the selective optical system, said reflective plate reflecting a center portion of the light primarily containing the signal light component, and
- wherein said support member either allows the stray light component to pass through or attenuates the stray light component, and
- wherein said reflective plate is more reflective than said support member, and
- wherein said support member is a transparent member arranged on the condensing optical element side of said reflective plate.

9. The optical pick-up device according to claim 8, wherein the extraction optical system is arranged between the light source and the object lens and further includes a polarizing branching optical element branching the return light in the direction toward the condensing optical element, and wherein an optical path of the signal light component extracted by the extraction optical system is inclined with respect to an optical path of the return light from the polarizing branching optical element.

10. The optical pick-up device according to claim 9, further comprising a light receiving element for monitoring arranged in the vicinity of a condensing position of a light branched by the polarizing branching optical element.

11. An optical disc apparatus capable of performing at least reproducing information to an optical disc having a plurality of recording layers, the apparatus comprising:
- an optical pick-up device illuminating a light to the optical disc having a plurality of recording layers and receiving a reflected light from the optical disc, the optical pick-up device including a light source; an object lens condensing a light emitted from the light source to an access target recording layer of the plurality of recording layers of the optical disc; an extraction optical system arranged on an optical path of a return light reflected by the optical disc via the object lens and extracting from a light in which a signal light component from the access target recording layer of the plurality of recording layers and a stray light component from a recording layer other than the access target recording layer of the plurality of recording layers are mixed, the signal light component from the access target recording layer of the plurality of recording layers, the extraction optical system including a condensing optical element arranged in an optical path of the light and condensing the light, and a selective optical system to which the light condensed by the condensing optical element is incident and reflecting a light primarily containing the signal light component, the selective optical system comprising a reflective plate and a support member supporting the reflective plate; and a light detection device receiving a light from the extraction optical system and generating a signal corresponding to the amount of the received light; and
- a processing device performing reproducing information recorded in the optical disc using an output signal of the light detection device of the optical pick-up device;
- said condensing optical element focusing the reflected light on the reflective plate in the selective optical system, said reflective plate reflecting a center portion of the light primarily containing the signal light component, and
- wherein said support member either allows the stray light component to pass through or attenuates the stray light component, and
- wherein said reflective plate is more reflective than said support member, and
- wherein said support member is a transparent member arranged on the condensing optical element side of said reflective plate.

* * * * *